(No Model.)
F. P. BURNHAM & J. D. ALSUP.
CRANK HANGER FOR BICYCLES.
No. 550,587. Patented Dec. 3, 1895.
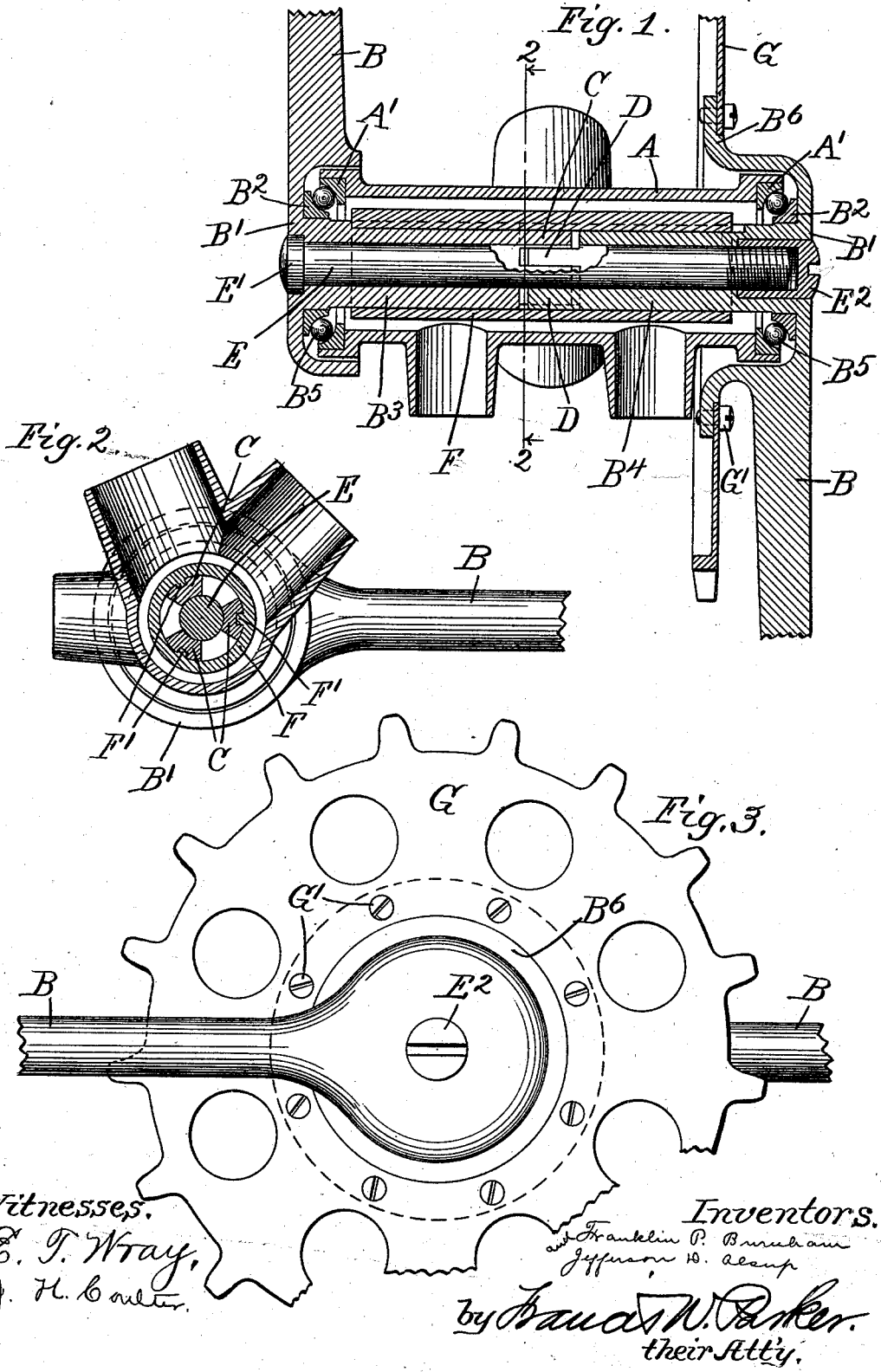
Witnesses.
E. T. Wray,
J. H. Coulter.
Inventors.
Franklin P. Burnham
Jefferson D. Alsup
by Francis W. Parker.
their Atty.

UNITED STATES PATENT OFFICE.

FRANKLIN P. BURNHAM AND JEFFERSON D. ALSUP, OF CHICAGO, ILLINOIS, ASSIGNORS OF ONE-THIRD TO FRANK H. RAY, OF SAME PLACE.

CRANK-HANGER FOR BICYCLES.

SPECIFICATION forming part of Letters Patent No. 550,587, registered December 3, 1895.

Application filed December 11, 1894. Serial No. 531,454. (No model.)

*To all whom it may concern:*

Be it known that we, FRANKLIN P. BURNHAM and JEFFERSON D. ALSUP, citizens of the United States, residing at Chicago, in the county of Cook and State of Illinois, have invented certain Improvements in Crank-Hangers for Bicycles, of which the following is a description.

Our invention relates to bicycle crank-hangers, and has for its object to produce an improved crank-hanger which allows the maximum distance between the bearings with the minimum of tread in any given machine.

The following is a description of our invention, reference being had to the accompanying drawings, wherein—

Figure 1 is a longitudinal section of the hanger, showing the several parts in their relative positions. Fig. 2 is a cross-section on line 2 2 of Fig. 1. Fig. 3 is an end view of the crank-hub.

Like letters of reference refer to like parts throughout the several figures.

The crank-shaft sleeve A, to which the frame of the bicycle is connected, is constructed as in ordinary bicycles, and is provided at the ends with the inside cones A' A'. The cranks B B are provided with the hollow hubs B' B', which contain the outside cones B² B² and which are preferably integral with said cranks. Connected with the crank-hubs B' B' and preferably integral therewith are the inwardly-projecting portions B³ and B⁴, which are provided with the teeth C and D, adapted to interlock and connect the two portions together. The balls B⁵ B⁵ work between the cones A' and B². A bolt or rod E passes through the hubs B' B' and is held in place by the head E' and nut E². The bearings may be adjusted by means of the nut E².

In order to strengthen the connection between the projecting portions B³ B⁴ of the hubs B' B', we use a sleeve F, which surrounds said projecting portions and which is provided with the keys F' F', adapted to fit into keyways on said portions B³ B⁴. By this construction the torsional strength of the crank connection is greatly increased.

It is evident that the teeth C and D may be dispensed with when the sleeve F is used, and that when said teeth are used the sleeve may be omitted; but we prefer to use both the teeth and the sleeve, as shown.

The sprocket-wheel G is fastened in any convenient manner to the flange B⁶ on the hub B', as by means of the screws G'G'.

It will be seen that we have here a simple, cheap, and light construction, by which we secure the maximum width between the bearings, and hence a narrow-tread bicycle is secured without the disadvantages attending the narrowing of the tread in bicycles as ordinarily constructed, such as injury to the bearings and the like.

We have described these several parts in detail; but it is evident that they may be varied somewhat in form and construction without departing from our invention, and we therefore do not wish to be limited to the exact construction shown.

We claim—

1. The combination in a bicycle hanger of a crank shaft, a sleeve surrounding said crank shaft and provided at each end with a ball bearing cone, cranks provided with hollow hubs containing ball bearing cones and adapted to receive the ends of the crank shaft sleeve, and a series of balls contained within said hollow crank hubs and adapted to bear against said bearing cones, substantially as described.

2. A bicycle comprising cranks having hollow or recessed hubs integral therewith and adapted to receive the bearing balls, each hub being provided with an inwardly projecting portion connected rigidly thereto, said inwardly projecting portions connected so as to rotate together, and a sleeve surrounding said inwardly projecting portions and provided with a bearing surface for said bearing balls.

3. A bicycle comprising cranks having hollow or recessed hubs adapted to receive the bearing balls each hub being provided with inwardly projecting portions preferably integral therewith, said inwardly projecting portions provided with teeth adapted to interlock, a sleeve adapted to be connected with said inwardly projecting portions to cause them to rotate together, and a surrounding sleeve or support provided with a bearing surface for said bearing balls substantially as described.

4. A bicycle comprising hollow or recessed hubs having cranks connected thereto, said hubs provided with ball bearing cones in the same plane as the cranks and being rigidly connected so as to rotate together, a non-rotatable sleeve associated with said hubs and provided with ball bearing cones opposed to the cones in the recessed hubs, and a series of balls contained within said recessed hubs and adapted to bear against said bearing cones.

Chicago, Illinois, December 6, 1894.

FRANKLIN P. BURNHAM.
JEFFERSON D. ALSUP.

Witnesses:
DONALD M. CARTER,
J. H. COULTER.